United States Patent [19]

Dien et al.

[11] Patent Number: 4,544,728

[45] Date of Patent: Oct. 1, 1985

[54] STORAGE-STABLE THERMOSETTING COMPOSITIONS COMPRISING IMIDO PREPOLYMERS

[75] Inventors: Rene Dien, Millery; Guy Poulain, Gournay sur Marne, both of France

[73] Assignee: Rhone-Poulenc Specialites Chimiques, Courbevoie, France

[21] Appl. No.: 664,795

[22] Filed: Oct. 25, 1984

[30] Foreign Application Priority Data

Oct. 25, 1983 [FR] France ................................ 83 17218

[51] Int. Cl.$^4$ ............................................. C08G 77/06
[52] U.S. Cl. ........................................ 528/21; 528/26; 528/27; 528/28
[58] Field of Search ....................... 528/26, 27, 28, 21

[56] References Cited

U.S. PATENT DOCUMENTS 3,763,081 10/1973 Holub et al. ......................... 524/404
4,361,690 11/1982 Locatelli ................................ 528/21

Primary Examiner—Melvyn I. Marquis
Attorney, Agent, or Firm—Burns, Doane, Swecker & Marthis

[57] ABSTRACT

Storage-stable thermosetting compositions, well adopted for molding or the production of prepregs, and characterized by the absense of gas release upon crosslinking, are comprised of (A) an imido/hydroxylated organosilicon compound prepolymer, (B) triallyl isocyanurate or an acrylic ester of an ethoxyphenylated siloxane, and (C) an imidazole compound.

15 Claims, No Drawings

STORAGE-STABLE THERMOSETTING COMPOSITIONS COMPRISING IMIDO PREPOLYMERS

BACKGROUND OF THE INVENTION

1. Field of the Invention

The present invention relates to hardenable compositions based on prepolymers comprising imide and siloxane groups and various adjuvants, and, more especially, to hardenable such compositions which are storage stable, film-forming at temperatures ranging from 40° to 90° C., tacky at ambient temperature and supple.

2. Description of the Prior Art

Very many hardenable compositions of the aforesaid general type have been described in the literature, each having various advantages and disadvantages.

Thermosettable compositions obtained from dimalemides and hydroxylated silanes, for example, are described in French Pat. No. 2,460,308. These compositions do not have the characteristics of suppleness which are required for the intended applications thereof. In addition, as a thin layer, they are devoid of tackiness. Cf. U.S. Pat. Nos. 3,763,081 and 4,361,690.

SUMMARY OF THE INVENTION

Accordingly, a major object of the present invention is the provision of a novel class of storage-stable compositions which are film-forming at temperatures ranging from 40° to 90° C. and preferably from 60° to 80° C., and which are also tacky at ambient temperature and supple.

By the term "storage-stable composition" as utilized herein, there is intended a composition which remains homogeneous (no crystallization of any component) and which does not change over time.

By the term "film-forming composition" as utilized herein, there is intended a composition which is liquid at temperatures of from 40° to 90° C. and can be deposited onto a substrate by coating or other conventional techniques for deposition onto a woven or non-woven material, a fibrous mat, or a transfer paper, the fibers forming these various supports being covered in a continuous manner, either directly or after transfer.

By the term "composition which is tacky at ambient temperature" as utilized herein, there is intended a composition which, when deposited onto the substrate and returned to ambient temperature, permits this substrate to be fixed in place by simple pressure and to be held in contact in any position.

And by the term "supple composition" as utilized herein, there is intended a composition which, when deposited onto the substrate, does not increase the rigidity of said substrate, permitting the latter to adopt the shapes of the components to be produced which may be, for example, articles of revolution incorporating convex and concave portions, and which may have rounded forms and/or ridges.

Briefly, the novel thermosettable compositions according to the invention comprise:

(A) a prepolymer obtained by reaction at a temperature of from 50° C. to 300° C. of:
 (a) a diimide or plurality of diimides, or combination of diimide and N-cyclohexylmaleimide, each such diimide or diimides having the general formula:

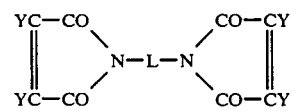

where Y denotes H, CH$_3$ and the symbol L denotes a divalent radical selected from among cyclohexylene, phenylene, tolylene or 2,5-diethyltolylene radicals and radicals of the formula:

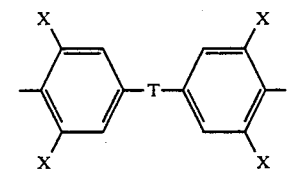

in which T denotes a

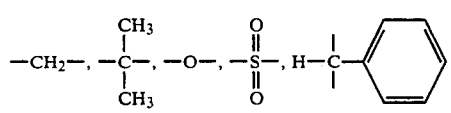

or

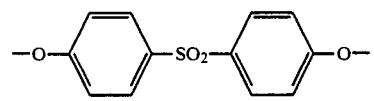

group, and X denotes H, CH$_3$, or isopropyl; with
 (b) an organosilicon compound comprising at least one hydroxyl group bonded to a silicon atom thereof;
(B) a triallyl isocyanurate, or an acrylic ester of an ethoxyphenylated siloxane compound of the general formula:

$$R-CH=C(H \text{ or}$$ (4)

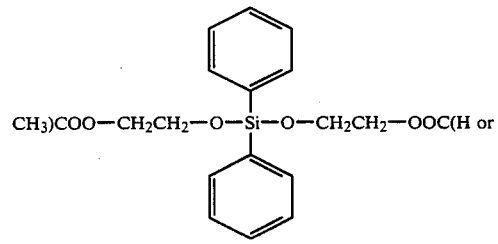

$$CH_3)C=CH-R$$

wherein R is a hydrogen atom, or a methyl or ethyl radical; and
(C) an imidazole compound.

DETAILED DESCRIPTION OF THE INVENTION

More particularly according to the present invention, representative diimides of the formula (1) are, for example:
 (i) N,N'-cyclohexylenedimaleimides;
 (ii) N,N'-metaphenylenedimaleimides;
 (iii) N,N'-paraphenylenedimaleimides;
 (iv) N,N'-4,4'-diphenylmethanedimaleimides;

(v) N,N′-(4,4′-diphenyl ether)dimaleimides;
(vi) N,N′-4,4′-(diphenyl sulfone)dimaleimides;
(vii) N,N′-tolylenedimaleimides;
(viii) N,N′-4,4′-triphenylmethanedimaleimide;
(ix) N,N′-cyclohexyldi(phenylmaleimides);
(x) 2,2′-propane N,N′-di(phenylmaleimides);
(xi) 1,1-cyclohexane N,N′-di(4-methyl-3-phenylmaleimide); and
(xii) diethyltolylene-N,N′-dimaleimides.

These diimides may be prepared by using the method described in U.S. Pat. No. 2,444,536 for the preparation of N-arylmaleimides.

The hydroxylated organosilicon compounds comprising the compositions of the invention are known compounds having the following general formula (5):

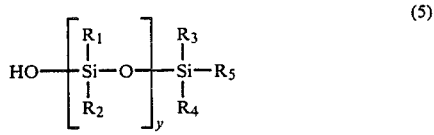

in which $R_1$, $R_2$, $R_3$, $R_4$ and $R_5$, which are identical or different, denote a hydroxyl group or a group of the type $-OR_6$ in which $R_6$ is a linear or branched alkyl radical containing from 1 to 6 carbon atoms or a phenyl radical; a hydrogen atom; a linear or branched chain alkyl radical containing from 1 to 6 carbon atoms and optionally substituted by one or more chlorine or fluorine atoms or by a $-CN$ group; a linear or branched chain alkenyl radical containing from 1 to 6 carbon atoms; or a phenyl radical, optionally substituted by one or more alkyl and/or alkoxy radicals containing from 1 to 4 carbon atoms, or by one or more chlorine atoms; and y is a whole or fractional number ranging from 0 to 1,000.

For a specified organosilicon compound having the formula (5), y is actually always an integer, but since, in fact, the compounds in question have a polymeric structure (when y is greater than 1), there rarely exists a single compound, but most frequently a mixture of compounds of the same chemical structure, which differ in the number of recurring units in their molecule; this results in an average value of y, which may of course either be whole or fractional.

The hydroxylated organosilicon compounds of the above-mentioned type may be characterized by the ratio of the weight of their hydroxy groups to the total weight of their molecule.

The organosilicon compounds which are preferably employed according to the present invention are the above-mentioned compounds in which the ratio by weight of the hydroxy groups in the molecule to the total weight thereof is equal to at least 0.05% and preferably to 0.1%.

Among the organosilicon compounds falling within this preferred group, those which are very particularly preferred are the compounds of the formula (5), in which $R_1$, $R_2$, $R_3$ and $R_4$, which are identical or different, denote a linear or branched chain alkyl radical containing from 1 to 6 carbon atoms, or a linear or branched chain alkenyl radical containing from 1 to 6 carbon atoms, or a phenyl radical; $R_5$ denotes a hydroxy group; and y is a number, whole or fractional, ranging from 0 to 250.

They are, therefore, silanediols when y is equal to 0 and polysiloxanediols when y is other than 0.

For their preparation, reference is made to W. Noll, *Chemistry and Technology of Silicones*, (English translation of the 1968 German edition), published by Academic Press of New York.

Exemplary of the organosilicon compounds which are most preferred, representative are:
(i) diethylsilanediol;
(ii) diphenylsilanediol;
(iii) methylphenylsilanediol;
(iv) 1,1,3,3-tetramethyldisiloxane-1,3-diol;
(v) 1,1-dimethyl-3,3-diphenyldisiloxane-1,3-diol;
(vi) 1,3-dimethyl-1,3-diphenyldisiloxane-1,3-diol;
(vii) 1,1,3,3,5,5-hexamethyltrisiloxane-1,5-diol;
(viii) 1,1,3,3,5,5,7,7-octamethyltetrasiloxane-1,7-diol;
(ix) 1,1,3,3,5,5,7,7,9,9-decamethylpentasiloxane-1,9-diol;
(x) 1,1,3,3,5,5,7,7,9,9,11,11-dodecamethylhexasiloxane-1,11-diol;
(xi) 1,3,5,7,9-pentamethyl-1,3,5,7,9-pentaphenylpentasiloxane-1,9-diol; and
(xii) their corresponding higher homologs.

The hydroxylated organosilicon compounds which are very particularly suitable can also be mixtures of two or more of the above-mentioned compounds. Thus, for convenience, it is possible to employ commercial hydroxylated polysiloxane oils or resins. These are, in particular, α,ω-dihydroxylated polymethylpolysiloxane oils containing from 0.2 to 0.3% by weight of hydroxy groups (Rhone-Poulenc oil 48 V 500), or 10 to 12% by weight of hydroxy groups (Rhone-Poulenc oil 48 V 50) or α,ω-dihydroxylated methylphenylpolysiloxane oils or resins containing 4.5% to 5% by weight of hydroxy groups (Rhone-Poulenc oil 50606) or from 7.5 to 8.5% by weight of hydroxy groups (Rhone-Poulenc resin 50305); these commercial oils or resins are given by way of example, but others exist which may be equally as suitable.

In the prepolymers according to the invention which are prepared from the diimide (1) and the hydroxylated organosilicon compound (5), the quantities of reactants are selected such as to provide a weight ratio:

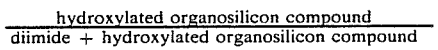

ranging from 5% to 80%.

Typically, a weight ratio of from 10% to 50% is selected.

Another way to define the relative proportions of diimide and of hydroxylated organosilicon compound consists of indicating the ratio of the number of hydroxy functions in the organosilicon compound to the number of the imide groups in the diimide. This ratio, in general, ranges from 0.003 to 10, and preferably ranges from 0.01 to 2.

In the compositions according to the invention amounts of diimide are advantageously used which constitute from 60 to 90% by weight of the prepolymer (A) and amounts of hydroxylated organosilicon compound are advantageously used which constitute from 10 to 40% by weight of said prepolymer (A).

The acrylic ester of the formula (4) is an acrylic or methacrylic ester which may be substituted or unsubstituted in the acrylic radical by a methyl or ethyl radical.

Diphenyldiethoxysilane dimethacrylate is preferred. This ester is advantageously used in a concentration of from 10 to 20% by weight relative to the total weight of the composition.

The triallyl isocyanurate is also advantageously employed in a concentration of from 10 to 20% by weight relative to the total weight of the composition.

The imidazole compound (C) advantageously has the general formula:

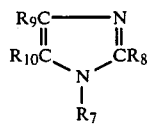  (6)

in which $R_7$, $R_8$, $R_9$ and $R_{10}$, which are identical or different, denote a hydrogen atom, an alkyl or alkoxy radical containing from 1 to 20 carbon atoms, vinyl, phenyl, or nitro, and $R_9$ and $R_{10}$ together with the carbon atoms from which they depend, may form a single ring member, such as, for example, a benzene ring.

Exemplary imidazole compounds which are representative are imidazole or glyoxaline, 1-methylimidazole, 2-methylimidazole, 1,2-dimethylimidazole, 1-vinylimidazole, 1-vinyl-2-methylimidazole and benzimidazole.

The imidazole compound is employed in catalytic amounts. Depending upon the nature of the imidazole compound and the rate of polymerization required during the use thereof, the imidazole compound is employed in a concentration of from 0.05 to 3% by weight relative to the total weight of the composition.

Various adjuvants may be included in the compositions according to the invention. These adjuvants, which are conventionally used and well known to one skilled in this art, may be, for example, stabilizers or decomposition inhibitors, lubricants or demolding agents, dyes or pigments, powdered or particulate fillers such as silicates, carbonates, kaolin, chalk, powdered quartz, mica, ballotini, and the like. Adjuvants which modify the physical structure of the product obtained may also be included, such as, for example, foaming agents or fibrous reinforcing agents; carbon fibrils, polyamide fibrils, aromatic polyamide fibrils, whiskers, and the like.

The manufacturing process is such that the resin (prepolymer) which is ready for use has sufficient suppleness and tack in a thin layer. In addition, in order to produce a homogeneous material after lamination, the reactions which give rise to highly volatile compounds at cure temperatures must be minor. To this end, when starting from a silanediol it is desirable to first carry out most of the oligomerization reaction which produces water as a byproduct; this water can be removed more easily during the manufacture of the resin.

Firstly, an intimate admixture of the compounds containing maleimide groups and the hydroxylated organosilicon compound is formulated. To prevent premature homopolymerization of the maleimides, which would result in an excessively viscous resin, the mixture of maleimide and hydroxylated silane is melted in the absehce of catalyst at a temperature which does not exceed the melting point of the maleimide which is the most difficult to liquefy. When beginning with an organosilane compound which is rich in hydroxy groups and capable of forming siloxane chains with addition of the OH groups to the maleimide double bonds, the mixture is kept molten such as to produce part of the oligomerization of the silanediol. Preferably, this compound will be heated to approximately 150° C. until approximately 40% of the initial hydroxy groups have disappeared while this compound is converted into an oligomer. In an alternative embodiment, this oligomerization may be carried out before adding the compounds containing maleimide groups.

The catalyst is added to the well-stirred mixture such as to permit rapid dispersion of the catalyst. When the catalyst is particularly active, to avoid its encapsulation in the polymer network which it produces, it is desirable to add it in a diluent which is compatible with the reaction medium. It has been found that it could be advantageous to employ as a diluent all or a fraction of the triallyl isocyanurate used in the composition.

The mixture is degassed to remove the volatiles which are undesirable for the preparation of laminates. The tackifying agent is added last and the resin is cast immediately after homogenization.

The compositions may be employed in molding or impregnation operations. They may be employed to produce coatings, adhesive bonds, laminates and reinforced composite materials. The reinforcing material may be in the form of woven or non-woven sheets, one-directional components, or natural or synthetic chopped fibers such as filaments or fibers made of glass, boron, carbon, tungsten, silicon, polyamide-imides or aromatic polyamides. The compositions are of particular interest for the production of intermediate preimpregnated articles without solvent. Impregnation of the fibrous material may be carried out by the usual techniques such as immersion, coating with a doctor blade or screen, or transfer impregnation. The transferable film and the preimpregnated articles may be employed directly or may be stored for subsequent use; they retain their properties remarkably during cold storage at temperatures of from 0° to 10° C.

The impregnated materials can be employed to produce articles of various shapes and for various purposes in many industries such as, for example, in aircraft construction. These articles, which may be wound articles, are obtained by stacking several layers of prepregs on a form or a support.

Cross-linking is then carried out under the usual conditions applicable to composite materials and in particular at temperatures of from 100° to 300° C.

The prepregs may also be employed as reinforcements or means for repairing damaged articles.

However, also envisaged are articles depending on techniques employing filament winding with or without support, injection molding or pultrusion.

It is also possible to produce products having high mechanical strength and heat resistance.

In order to further illustrate the present invention and the advantages thereof, the following specific examples are given, it being understood that same are intended only as illustrative and in nowise limitative.

EXAMPLE 1

A mixture of:
(i) 420 g of N,N',4,4'-diphenylmethanedimaleimide;
(ii) 280 g of N,N',2,4-tolylenedimaleimide; and
(iii) 300 g of diphenylsilanediol,
was added over 24 min to a reactor equipped with a stirrer and degassing means and placed in an oil bath thermostated at 160° C.

The mixture was stirred for 26 min until a homogeneous mass was produced. The reaction mixture was cooled to 123° C. 0.500 g of imidazole was added in the form of a 25% strength solution in N-vinylpyrrolidone.

After stirring for 1 min, degassing was carried out for 4 min under a reduced pressure of 400 Pa. The clear mixture was cast at ambient temperature as a thin layer. The resin flaked off and displayed no tackiness. When maintained molten, it began to crystallize after 1 hour, 45 min at 90° C.

EXAMPLE 2

The preceding example was repeated as regards the addition of the catalyst. Stirring was carried out for 1 min at 120° C. under atmospheric pressure, then for 20 min under reduced pressure while cooling to 90° C. 109.5 g of diphenyldiethoxysilane dimethacrylate marketed by Rhone-Poulenc under the trademark SILANE 186 were then added thereto. After homogenization for 2 min the resin was cast as a thin film deposited onto a silicone-coated paper (transfer paper permitting transfer of the resin to a glass, carbon or other cloth). The resin was supple and tacky at ambient temperature.

EXAMPLE 3

824 g of diphenylsilanediol were charged into a 10-liter kneader heated by a double jacket and equipped with an anchor-type stirrer rotating at 85 rev/min.

After stirring for 5 min, the temperature of the double jacket being regulated at 160° C., a powdery mixture containing:

(i) 3,700 g of bis-malemido-4,4'-diphenylmethane,
(ii) 2,467 g of 2,4-tolylenedimalemide,
(iii) 1,819 g of diphenylsilanediol,
was added thereto at a regular rate over 35 min.

Upon completion of this addition the pasty mixture was at a temperature of 136° C. After agitation for 9 min the temperature was 158° C. and the mixture was completely liquid. A partial oligomerization of the silanediol was permitted to proceed for 20 min; the temperature was maintained at 152° C. The temperature was reduced to 125° C. over 13 min. The reaction mass was then degassed to remove the water which was formed. This operation lasted for 22 min at a temperature of 122° C.±3° C., the pressure being gradually adjusted to 266 Pa.

A solution containing
(i) 6.17 of imidazole, and
(ii) 18.53 g of N-vinylpyrrolidone
was added thereto over 2 min.

The material was again evacuated for 7 min at a pressure of 660 Pa and a temperature of 123° C. 1,562.3 g of triallyl isocyanurate were added and the mixture was homogenized for 2 min. Volatiles present in the TAIC were removed by evacuating for 3 min under a pressure of approximately 660 Pa at a temperature of 108° C. The resin was drained.

The composition had a gel time of:
70 min at 150° C.
47 min at 160° C.
32 min at 170° C.
20 min at 180° C.

Its melt viscosity was measured in a rotary viscometer at a rate of 104 sec$^{-1}$. At 90° C. it was 6.4 poises. The change in viscosity was measured at 90° C. It changed to 8.5 poises over 2 hours. The resin remained perfectly clear.

The concentration of maleimide double bonds in the resin ready for use constituted 92.3% of the double bonds originally charged. The oligomerization of diphenylsilanediol can be estimated from the amount of water trapped during the degassing operations. It corresponded to a 46.5% conversion of the hydroxy groups to siloxane bonds.

When a layer of approximately 13/100 mm was deposited onto a transfer paper, it was found that a glossy, supple and adhesive layer was obtained. When stored at ambient temperature and at an EH equal to or below 50%, the coating was still supple and adhesive after 12 days.

EXAMPLE 4

A high-strength carbon fiber cloth was impregnated by deposition thereon of molten resin, using the resin prepared in Example 3. This cloth had a weight of 285 g/m$^2$; between 230 and 250 g of resin were deposited per m$^2$.

After being coated the prepreg was stored for 30 days at 5° C.

Specimens 30×30 cm in size were cut therefrom. Seven layers of prepregs were stacked (web and weft fibers being arranged parallel to each other).

Polymerization was carried out using the vacuum bag technique at 250° C. under a pressure of 50.10$^4$ Pa. Finally, the composite was subjected to a post-cure for 24 h at 250° C. The plaques obtained had a thickness of 3.15 mm and a resin content of approximately 42%.

Specimens 105×25×2.15 mm in size were cut from these plaques and the mechanical properties of these specimens were measured at 20° C. and at 240° C. For the tests at 240° C. the period of increase in temperature was 10 minutes. It was followed by a plateau of 15 minutes at 240° C.

The stress at flexural failure and the flexural modulus were measured on specimens placed on lower supports 70 mm apart, the speed of travel of the punch being 1 mm/min.

The following results, expressed in Mpa, were obtained:

| Test temperature | Stress at failure | Modulus of Elasticity |
| --- | --- | --- |
| 20° C. | 680 | 53,400 |
| 240° C. | 510 | 53,000 |

It was found that stress at flexural failure varied very little at 240° C. relative to 20° C. and that the values of the modulus of elasticity were substantially the same, whether cold or hot.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A thermosetting composition of matter which comprises:
(A) a prepolymeric reaction product of:
   (a) a diimide or plurality of diimides, or combination of diimide and N-cyclohexylmaleimide, each such diimide or diimides having the general formula:

$$\begin{matrix} YC-CO \\ \| \quad \diagdown \\ \quad \quad N-L-N \\ \| \quad \diagup \\ YC-CO \end{matrix} \begin{matrix} CO-CY \\ \diagdown \quad \| \\ \\ \diagup \quad \| \\ CO-CY \end{matrix} \quad (1)$$

wherein Y is H or CH₃ and L is cyclohexylene, phenylene, tolylene, 2,5-diethyltolylene, or a radical of the formula:

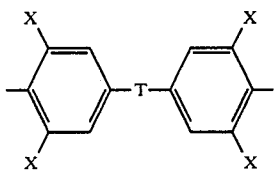

in which T is:

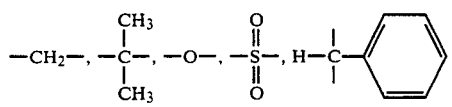

or

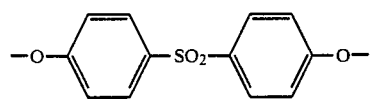

and X is H, CH₃ or isopropyl; with
(b) an organosilicon compound comprising at least one hydroxy group bonded to a silicon atom thereof;
(B) a triallyl isocyanurate, or an acrylic ester of an ethoxyphenylated siloxane compound of the general formula:

R—CH=C(H or                                                     (4)

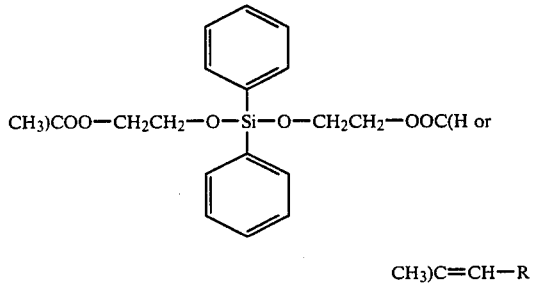

CH₃)C=CH—R in which R is H, CH₃ or C₂H₅; and
(C) an imidazole compound.

2. The composition of matter as defined by claim 1, wherein said diimide (1) comprises an N,N'-cyclohexylenedimaleimide, N,N'-metaphenylenedimaleimide, N,N'-paraphenylenedimaleimide, N,N'-4,4'-diphenylmethanedimaleimide, N,N'-(4,4'-diphenyl ether)-dimaleimide, N,N'-4,4'-(diphenyl sulfone)dimaleimide, N,N'-tolylenedimaleimide, N,N'-4,4'-triphenylmethanedimaleimide, N,N'-cyclohexyldi(phenylmaleimide), 2,2'-propane N,N'-di (phenylmaleimide), 1,1-cyclohexane N,N'-di(4-methyl-3-phenylmaleimide), or diethyltolylene-N,N'-dimaleimide.

3. The composition of matter as defined by claim 1, wherein said diimide (1) comprises N,N'-4,4'-diphenylmethanedimaleimide, 2,4-tolylenedimaleimide, or mixture thereof.

4. The composition of matter as defined by claim 1, wherein said organosilicon compound (b) has the general formula:

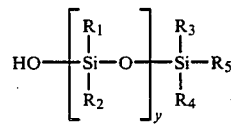

in which R₁, R₂, R₃, R₄ and R₅, which are identical or different, are each a hydroxyl group or —OR₆ wherein R₆ is a linear or branched chain alkyl radical containing from 1 to 6 carbon atoms or a phenyl radical; a hydrogen atom; a linear or branched chain alkyl radical containing from 1 to 6 carbon atoms, optionally substituted by one or more chlorine or fluorine atoms or by a —CN group; a linear or branched chain alkenyl radical containing from 1 to 6 carbon atoms; or a phenyl radical, optionally substituted by one or more alkyl and/or alkoxy radicals containing from 1 to 4 carbon atoms, or by one or more chlorine atoms; and y is a whole or fractional number ranging from 0 to 1,000.

5. The composition of matter as defined by claim 4, wherein said organosilicon compound (b) comprises diethylsilanediol, diphenylsilanediol, methylphenylsilanediol, 1,1,3,3-tetramethyldisiloxane-1,3-diol, 1,1-dimethyl-3,3-diphenyldisiloxane-1,3-diol, 1,3-dimethyl-1,3-diphenyldisiloxane-1,3-diol, 1,1,3,3,5,5-hexamethyltrisiloxane-1,5-diol, 1,1,3,3,5,5,7,7-octamethyltetrasiloxane-1,7-diol, 1,1,3,3,5,5,7,7,9,9-decamethylpentasiloxane-1,9-diol, 1,1,3,3,5,5,7,7,9,9,11,11-dodecamethylhexasiloxane-1,11-diol, or 1,3,5,7,9-pentamethyl-1,3,5,7,9-pentaphenylpentasiloxane-1,9-diol.

6. The composition of matter as defined by claim 4, wherein said organosilicon compound (b) comprises diphenylsilane-diol.

7. The composition of matter as defined by claim 4, wherein said imidazole compound (C) has the general formula:

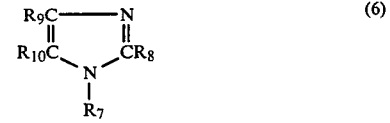

in which R₇, R₈, R₉ and R₁₀, which are identical or different, are each a hydrogen atom, an alkyl or alkoxy radical containing from 1 to 20 carbon atoms, vinyl, phenyl, or nitro, and R₉ and R₁₀ together with the carbon atoms from which they depend, may form a single ring member.

8. The composition of matter as defined by claim 7, wherein said imidazole compound (C) comprises imidazole or glyoxaline, 1-methylimidazole, 2-methylimidazole, 1,2-dimethylimidazole, 1-vinylimidazole, 1-vinyl-2-methylimidazole or benzimidazole 9. The composition of matter as defined by claim 1, wherein said prepolymer (A) comprises from 60 to 90% by weight of said diimide (1) and 10 to 40% by weight of said organosilicon compound (b).

10. The composition of matter as defined by claim 9, wherein said component (B) comprises from 10 to 20% by weight of the total weight thereof.

11. The composition of matter as defined by claim 10, wherein said component (C) comprises from 0.05 to 3% by weight of the total weight thereof.

12. A process for the preparation of the composition of matter as defined by claim 1, comprising intimately admixing said diimide (a) and said hydroxylated organosilicon compound (b), melting said admixture, adding the imidazole compound (C) dissolved in a diluent thereto, under vigorous stirring, next degassing the resulting composition, then adding the triallyl isocyanurate or acrylic ester (B) thereto, and casting, after homogenization, the resin which results therefrom.

13. The composition of matter as defined by claim 1, in thermoset state.

14. A shaped article comprising the composition of matter as defined by claim 1.

15. A shaped article comprising the composition of matter as defined by claim 13.

* * * * *